(12) United States Patent
Warnes et al.

(10) Patent No.: US 9,283,692 B2
(45) Date of Patent: Mar. 15, 2016

(54) METHOD FOR PRODUCING WOOD FIBRE-PLASTICS COMPOSITE PRODUCTS

(75) Inventors: Jeremy Martin Warnes, Rotorua (NZ); Alan Fernyhough, Rotorua (NZ)

(73) Assignee: NEW ZEALAND FOREST RESEARCH INSTITUTE LIMITED, Rotorua (NZ)

(*) Notice: Subject to any disclaimer, the term of this patent is extended or adjusted under 35 U.S.C. 154(b) by 380 days.

(21) Appl. No.: 13/381,511

(22) PCT Filed: Jun. 30, 2010

(86) PCT No.: PCT/NZ2010/000131
§ 371 (c)(1),
(2), (4) Date: Mar. 22, 2012

(87) PCT Pub. No.: WO2011/002314
PCT Pub. Date: Jan. 6, 2011

(65) Prior Publication Data
US 2012/0172494 A1    Jul. 5, 2012

(30) Foreign Application Priority Data
Jun. 30, 2009   (NZ) ........................................ 578110

(51) Int. Cl.
C08L 63/00   (2006.01)
B27N 1/00    (2006.01)
B27N 3/04    (2006.01)
C08J 5/04    (2006.01)
B29B 9/04    (2006.01)
B29B 9/14    (2006.01)

(52) U.S. Cl.
CPC ........ *B27N 1/003* (2013.01); *B27N 3/04* (2013.01); *C08J 5/045* (2013.01); *B29B 9/04* (2013.01); *B29B 9/14* (2013.01); *C08J 2361/24* (2013.01); *C08J 2431/04* (2013.01)

(58) Field of Classification Search
CPC ......... C08L 61/00; C08L 61/24; B27N 3/002; B27N 1/003; B27N 3/04; C08K 9/08; C08J 5/045
USPC ..................................................... 524/13, 14
See application file for complete search history.

(56) References Cited

U.S. PATENT DOCUMENTS

| | | |
|---|---|---|
| 3,309,444 A | 3/1967 | Shueler et al. |
| 3,386,879 A | 6/1968 | Yan et al. |
| 4,246,315 A | 1/1981 | Kopp et al. |
| 4,791,020 A | 12/1988 | Kokta |
| 4,831,089 A | 5/1989 | Flodman et al. |
| 5,120,776 A | 6/1992 | Raj et al. |
| 5,480,602 A | 1/1996 | Nagaich |
| 5,545,449 A | 8/1996 | Tiedeman |
| 5,569,542 A | 10/1996 | Burton et al. |
| 5,691,270 A | 11/1997 | Miller |
| 5,981,631 A | 11/1999 | Ronden et al. |
| 6,676,744 B2 | 1/2004 | Merkley et al. |
| 6,972,144 B2 | 12/2005 | Roth et al. |
| 7,071,248 B2 | 7/2006 | Chen et al. |
| 2001/0027217 A1 | 10/2001 | Jaetsch et al. |
| 2003/0046772 A1 | 3/2003 | Halahmi et al. |
| 2003/0152793 A1 | 8/2003 | Willemse |
| 2006/0234077 A1 | 10/2006 | Breyer et al. |
| 2007/0167540 A1 | 7/2007 | Vijayendran et al. |
| 2009/0229771 A1 | 9/2009 | Warnes et al. |
| 2009/0264560 A1 | 10/2009 | Warnes et al. |

FOREIGN PATENT DOCUMENTS

| | | |
|---|---|---|
| GB | 999696 | 7/1965 |
| GB | 1454118 | 10/1976 |
| NZ | 223268 | 5/1990 |
| NZ | 328745 | 3/1999 |
| NZ | 502074 | 3/2002 |
| WO | 9503925 | 2/1995 |
| WO | WO 00/24800 A1 | 5/2000 |
| WO | WO 2007/073218 A1 | 5/2000 |
| WO | 0228795 | 4/2002 |
| WO | 03089238 | 10/2003 |
| WO | 2004065508 | 8/2004 |
| WO | WO 2005/021656 A1 | 3/2005 |
| WO | WO 2006/001717 A1 | 1/2006 |

OTHER PUBLICATIONS

Kim, S., et al., "Effect of addition of polyvinyl acetate to melamine-formaldehyde resin on the adhesion and formaldehyde emission in engineered flooring", vol. 25, pp. 456-461, International Journal of Adhesion & Adhesives, 2005.
International Search Report cited in PCT/NZ2010/000131, dated Oct. 14, 2010.
Communication for EP 10799419.1 dated May 14, 2013, with Supplementary European Search Report dated May 2, 2013.
Office Action for New Zealand Application No. 3339-11 dated Dec. 29, 2011.

*Primary Examiner* — John Uselding
(74) *Attorney, Agent, or Firm* — Sughrue Mion, PLLC

(57) ABSTRACT

A process for producing a composite product comprising fibers of a lignocellulosic material or natural fibers and a plastics material utilizes a liquid or particulate binder formulation comprising a thermoset resin and a thermoplastic polymer, monomer, or oligomer. A composite product is formed for use as or in forming a feedstock in plastics manufacture may be broken down under heat and mechanical shearing in a plastics extrusion machine to release the major fraction of the fibers, or the product may be useful as an intermediate product in other form or as an end product.

50 Claims, No Drawings

METHOD FOR PRODUCING WOOD FIBRE-PLASTICS COMPOSITE PRODUCTS

CROSS REFERENCE TO RELATED APPLICATIONS

This application is a National Stage of International Application No. PCT/NZ2010/000131 filed Jun. 30, 2010, claiming priority based on New Zealand Patent Application No. 578110 filed Jun. 30, 2009, the contents of all of which are incorporated herein by reference in their entirety.

FIELD OF INVENTION

The invention relates to a process for producing a composite product comprising fibres of a lignocellulosic material or natural fibres and a plastics material, for use as or in forming a feedstock in plastics manufacture, or for use as an intermediate product in other form or as an end product.

BACKGROUND

The combining of cellulose-based materials with plastics was originally developed over 25 years ago. The materials for this process were pre-mixed and cram-fed. Specialist machines have recently been developed, generally based on traditional plastics manufacturing technologies including extrusion and injection moulding. The plastics used include polypropylene (PP), polyethylene (PE) and poly-vinyl-chloride (PVC) and the fillers used include wood flour, flax, jute and other cellulose-based fibre fillers. The more cellulose-based material that is added to the plastic, often the lower the price and, often, the higher the stiffness of the wood-plastic "raw" material. The composite products made from these wood-plastics can generally be nailed, painted and otherwise treated as wood whilst potentially retaining many of the benefits of plastics in the areas of fungal and corrosion resistance.

The introduction of low bulk density natural or wood fibres into extruders or injection moulders or other plastics processing machinery, in particular in a metered or measured way, which is important to achieve desired fibre volume fractions in compositions, has a number of difficulties. It is not straightforward, due to the inherent high volume/low mass nature of such fibres, the lack of free flowing characteristics in such fibres, and fibre bundling or entanglements, to achieve controlled feeding directly into port holes or orifices of plastics processing machinery. Although some fibre-feeders exist they can be either expensive and/or unreliable or inaccurate in metering uniformly over a wide range of fibre feed ratios with wood and other natural fibres. In addition, it is necessary to pre-dry a high volume-low mass of fibre before such feeding/use since such fibres are hygroscopic and retain, or reabsorb, high levels of water, which is usually undesired and required to be substantially removed prior to the plastic processing.

International patent application PCT/NZ2005/000140 discloses a process for producing pellets or granules (as herein defined) comprising fibres of a lignocellulosic material or natural fibres, for use as a feedstock in plastics manufacture, which comprises conveying fibres, produced by mechanically or thermomechanically or chemo-thermomechanically or chemo-mechanically breaking down a lignocellulosic material, or natural fibres, in a dry or wet air stream and applying to the fibres while so conveying the fibres a liquid formulation comprising one or more polymers, monomers, or oligomers, forming the fibres into a solid product, and breaking down the solid product to produce the wood-plastics composite pellets or granules useful as a feedstock in plastics manufacture.

OBJECT OF THE INVENTION

It is an object of the invention to provide an improved, or at least an alternative process or method for producing a composite product comprising fibres of a lignocellulosic material or natural fibres and a plastics material, for use as or in forming a feedstock in plastics manufacture, or for use as an intermediate product in other form, or as an end product.

SUMMARY OF THE INVENTION

In broad terms in one aspect the invention comprises a process for producing a product comprising fibres of a lignocellulosic material or natural fibres, for use as or in forming a feedstock in plastics manufacture, which comprises applying to loose or divided fibres or fibre bundles, produced by mechanically or thermomechanically or chemo-thermomechanically or chemo-mechanically breaking down a lignocellulosic material, or natural fibres, a formulation comprising one or more thermoset polymers and one or more thermoplastic polymers, monomers, or oligomers, said formulation being in liquid or particulate form, and consolidating the fibres into a solid product.

The resulting composite product comprising fibres of a lignocellulosic material or natural fibres and a plastics material, may be useful as or in forming a feedstock, in pellet or granule form for example, in plastics manufacture, or as an intermediate product in other form. It has also been surprisingly found that solid products formed by embodiments of this aspect of the process of the invention may have superior mechanical properties such as tensile strength and/or stiffness for example, to composite products formed in the same way but with only a thermoset or only a thermoplastic binder, so that the solid products may be useful as end products, such as panels or as composite replacements for medium density fibreboard mouldings for example.

In broad terms in another aspect the invention comprises a process for producing pellets or granules (as herein defined) comprising fibres of a lignocellulosic material or natural fibres, for use as a feedstock in plastics manufacture, which comprises:

conveying loose or divided fibres or fibre bundles, produced by mechanically or thermomechanically or chemo-thermomechanically or chemo-mechanically breaking down a lignocellulosic material, or natural fibres, in a dry or wet air stream and applying to the fibres while so conveying the fibres a liquid binder formulation comprising urea formaldehyde (UF) and one or more thermoplastic polymers, monomers, or oligomers, or a low amount of urea formaldehyde, consolidating the fibres into a solid product, and breaking down the solid product to produce said pellets or granules.

In this embodiment the solid product may comprise less than 6 parts, preferably between 0.2 and 5 parts of urea formaldehyde alone, per 100 parts of fibre by dried weights. In some forms, the pellets or granules preferably comprise 4 or 5 parts of urea formaldehyde alone, per 100 parts of fibre by dried weights.

Where a thermoset binder has been modified with a thermoplastic polymer, oligomer or monomer added to it, either during prepolymer synthesis, or by blending into the resin prepolymer later, or, by dual injection into the blowline at a separate point from the thermoset resin for example, or where, alternatively, only a low amount of a thermoset resin is used as the binder, it has been found that this allows easier dispersion of fibre from the pellet in a plastics extrusion or moulding machine. UF-based pellets, for example, produced at conventional UF loadings such as 6%-12% will require very specific extrusion conditions to get the optimum composite properties, such as high screw speed and low feed rate to maximize the shear stress inside the extruder barrel of an extrusion machine in order to break apart the pellets into fibres, to achieve the required mechanical performance of the composite. But those severe extrusion conditions are also likely to degrade the wood fibre, by thermal degradation, and cause a reduction in fibre length. Pellets or granules produced by the process of the invention may facilitate extrusion at lower screw speed and shear conditions, with good release of the fibre from the pellet in the extruder or other plastics manufacturing equipment. The use of a thermoset binder as described with a thermoplastic polymer, oligomer or monomer can also reduce the cost of the binder system and thus of the production of the wood-plastics composite feedstock product, relative to use of a thermoplastic binder alone, which may also provide good dispersion and release of the fibre from the wood-plastics feedstock pellet and plastics manufacture but at higher cost.

Where the thermoset resin is a urea, melamine or related formaldehyde resin, this has the further advantage of providing a degree of fire retardancy often required in the manufacturing of impregnated or coated wood fibres, compared to, for example, the use of many of those same thermoplastic polymer, oligomer or monomer alone.

In the development of wood and natural fibre plastic composites, two main categories have emerged. Those using wood flour primarily as a filler and those using longer agrifibres to give reinforced composites. The first category has grown significantly in North America where wood primarily acts as a filler lowering cost, although other benefits are realized. The second category utilizes more expensive agrifibres with high aspect ratio which tends to produce composites with better mechanical properties. Segments of the European automotive industry have made extensive use of these reinforced materials for interior car components that might otherwise have been made from glass fibre reinforced plastics. Researchers have explored a range of wood fibres of high aspect ratio for their reinforcing potential and improved properties over wood flour have been realised. However, there have been issues with feeding the fibres into an extruder and in the logistics of obtaining and handling loose wood fibre.

In embodiments of the invention the long established medium density fibreboard (MDF) process including HTMP (high temperature thermo-mechanical pulping) for example may be utilised to convert wood, or other residue fibres, into fibre rich pellets or granules suitable for feeding into existing plastics processing equipment while retaining sufficient aspect ratio for reinforcing. Embodiments of the process of the invention result in preservation of greater fibre length than wood flour making the resulting wood plastic composite (WPC) stronger and stiffer than those based on wood flour. HTMP refining is the lowest cost technology to convert biomass into lignocellulosic fibre in large quantities. Furthermore, the multiple sources and reliable supply of wood, not constrained by seasonality like agricultural fibres, is an advantage for any manufacturing operation.

The process of the invention can produce wood-plastics feedstock pellets with sufficient internal bond strength that the pellets have sufficient physical integrity for efficient handling in industrial processes, that are cheaper and may have better fire resistance than those utilising pure thermoplastic binding agents, and that are capable of releasing the individual wood fibres in the extruder or other plastics manufacturing equipment under conditions that permit the preservation of fibre length so as to facilitate the improved mechanical properties of the WPCs. The thermoplastic modified-thermoset binder formulation may also result in reduced interference with a coupling agent where used when the pellets are mixed with the plastics matrix. A further advantage may be limited dust production during pelletizing. Further it has also been surprisingly found that solid products formed by the process of the invention with thermoplastic modification of a thermoset resin binder may have superior mechanical properties such as tensile strength and/or stiffness for example, so that the solid products may be useful as end products, such as panels or as composite replacements for medium density fibreboard mouldings for example.

An important advantage of using long wood fibre instead of other wood fillers (particles, flour) is the reinforcement potential of the high fibre aspect ratio that allows strengthening of thermoplastics like polypropylene (PP) or high density polyethylene (HDPE) while at the same time playing the role of a filler, cost saver and petrochemical substitute. However it is well known that wood fibre and polyolefins are poorly compatible (hydrophilic/hydrophobic), hence a coupling agent (maleic anhydride modified polyolefin) may be used to improve the fibre adhesion/matrix adhesion, resulting in efficient load transfer from fibre to fibre and reinforce the composite strength.

The term 'comprising' as used in this specification and claims means 'consisting at least in part of', that is to say when interrupting independent claims including that term, the features prefaced by that term in each claim will need to be present but other features can also be present.

In this specification the following abbreviations may be used:
MDF: Medium Density Fiberboard
HTMP: High ThermoMechanical Pulping
MAPP: Maleic Anhydride grafted Polypropylene
PVA: Poly Vinyl Acetate
VAE: Vinyl Acetate Ethylene
EVA: Ethylene Vinyl Acetate
EVOH: Ethylene Vinyl Alcohol
EAA: Ethylene Acrylic Acid
PP: Polypropylene
HDPE: High Density Polyethylene
wt %: weight percentage
UF: Urea Formaldehyde
WPC: Wood Plastic Composite
WPP: Wood Plastic Pellets
MAPE: Maleic Anhydride grafted Polyethylene
PPc: Polypropylene coupled
PPnc: Polypropylene non coupled
PEc: High Density Polyethylene coupled
PEnc: High Density Polyethylene non coupled
IB: Internal Bond
MPa: Mega Pascal
GPa: Giga Pascal
ASTM: American Society for Testing and Materials

DETAILED DESCRIPTION OF EMBODIMENTS

As stated in some embodiments of the process of the invention loose or divided fibres or fibre bundles, produced by mechanically or thermomechanically or chemo-thermomechanically or chemo-mechanically breaking down a lignocellulosic material, or natural fibres, have applied a formulation comprising one or more thermoset polymers and one or more thermoplastic polymers, monomers, or oligomers, said formulation being in liquid or particulate form, and are consolidated into a solid product.

In these embodiments the binder formulation comprises a thermoset resin comprising one or more thermoplastic polymers, monomers, or oligomers, which may be present relative to the thermoset resin in a weight ratio up to about 50:50, or 40:60 or 20:80. The thermoplastic component of the binder formulation may be present relative to the thermoset resin in a weight ratio of at least about 10:90.

The solid products produced may comprise between 0.3 to 25 parts of the thermoset resin and modifying thermoplastic component. More preferably the combined thermoset resin and modifying thermoplastic component is present at less than 25, or less than 20 parts, per 100 parts of fibre by dried weights and more preferably less than 15 parts per 100 parts of fibre by dried weights and most preferably less than 12 parts or 10 parts or 8 parts or 6 parts or 5 or 4 or 3 or 2 parts per 100 parts of fibre by dried weights.

In at least some embodiments the thermoset resin comprises a formaldehyde-based polymer such as urea-formaldehyde, melamine formaldehyde, phenol-formaldehyde, resorcinol-formaldehyde, and other resins based on formaldehyde including biobased options such as tannin formaldehyde or lignin formaldehyde. Other aldehydes can also be incorporated with, or substituted for, formaldehyde as long as they co-react with the urea, phenolic or melamine in a similar manner to formaldehyde itself. This includes furfural, propanal, butyraladehyde, succinaldehyde, glutaraldehyde for example. Though formaldehyde is preferred aldehyde or ketone co-reactant, due to its wide availability, common use, economics and reactivity, other aldehydes or ketones or sources of methylol reactive groups may be used in a formaldehyde-based resin, as is known. Alternatively the thermoset resin may comprise another thermoset resin commonly used in MDF or particleboard or powder coating products or processes such as including isocyanates, or urethane resins.

In at least some embodiments the thermoplastic component comprises a polyvinyl alcohol, polyvinyl acetate, a polyester, polystyrene, polyethylene, polypropylene, ethylene-propylene copolymers and terpolymers acrylonitrile copolymers, ethylene-vinylacetate copolymer, polybutadiene, neoprene, polyisoprene and butyl rubber, acrylate or methacrylate polymers (acrylics), urethane polymers, polyvinyl chloride, halogenated polyethylene, polyvinyl pyrrolidone, acrylonitrile butadiene-styrene terpolymers (ABS), styrene-maleic anhydride copolymers and esterified or other derivatives thereof, polyamide, or copolymers of vinyl acetate, polyvinyl ethers and copolymers of vinyl ethers, starches and starch derivatives, proteins, polycaprolactone, polylactic acid, polyhydroxyalkanoates, proteins, polyacids, polyanhydrides, polyisocyanates, polyols/polyethers, and copolymers or terpolymers of the above and the like, and other polymers containing the monomers of such polymers and including copolymers or graft polymers of the above with unsaturated acids such as acrylic or methacrylic acid or their esters or maleic anhydride/acid, or their esters or half esters, or with vinyl alcohol or vinyl esters (e.g. vinyl acetate, vinyl butyrate), or with glycidyl; methacrylate/acrylate. Thermoplastics comprising one or more of the above are also suitable. Oligomeric forms of the above are also able to be used. Other ingredients which may be included include plasticising or flexibilising or co-reactive additives such as glycerols, sorbitol, other polyols, surfactants, amines or amino-alcohols, fatty acids/esters, esters or other derivatives of acids such as lactic acid, itaconic acid, citric acid, maleic acid, phthalic acids and others and also gums or their derivatives. In the process of the invention, resins such as those above or others may be formulated and used as the polymer and/or additives. The polymers may, in some cases, be formed in-situ from its starting or component monomers or oligomers. Thus, the added polymer(s) or additives may include reactive monomers or oligomers with reactive groups, applied as aqueous dispersions, emulsions or as neat liquids or molten media. or a polymer or copolymer with one or more of an acid, anhydride, epoxy, amine, isocyanate, silane, or silanol group. The thermoplastic polymer may have a softening temperature, glass transition temperature or melting point below 230° C., or below 200° C. Preferred thermoplastic polymers are polymers which can be processed as a thermoplastic substance or elastomers and are herein classified as thermoplastic substances and constitute a preferred subclass of plastic polymers. Examples of elastomers suitable for the preparation of concentrates of this invention are natural rubber, styrene-butadiene rubber (SBR), ethylenepropylene rubber (EPR), ethylene-propylene terpolymer (EPDM), acrylonitrile butadiene rubber (NBR), ethylene-vinylacetate copolymer, silicone rubber, polybutadiene rubber, cis-polybutadiene, trans-polybutadiene, neoprene, polyisoprene and butyl rubber, sulfur-vulcanizable diene rubbers. Diene rubber includes rubber of both low and high unsaturation, the unsaturation being either in a side chain or in the backbone of the polymer and either conjugated or non-conjugated. Examples of other suitable polymers include acrylate polymers, urethane polymers, chlorosulfonated polyethylene, polyvinyl chloride, halogenated polyethylene, polystyrene, polyvinyl acetate, polyvinyl alcohol, polyvinyl pyrrolidone, acrylonitrile butadiene-styrene terpolymers (ABS), styrene-maleic anhydride copolymers and esterified or other derivatives, polyamides, polyesters, or copolymers of vinyl acetate, copolymers of olefins (ethylene, propylene, . . . ) with unsaturated acids such as acrylic or methacrylic acid or maleic anhydride or with vinyl alcohol or vinyl esters, polyvinyl ethers and copolymers of vinyl ethers, starches and starch derivatives, polycaprolactone, polylactic acid, polyhydroxyalkanoates, proteins, polyacids, polyanhydrides, polyisocyanates, polyols/polyethers, and copolymers or terpolymers and the like, containing the monomers of such polymers. Mixtures comprising one or more of the above are also suitable. In the process of the invention, resins such as those above or others may be formulated and used as the thermoplastic component and/or additives. Thus the added polymer(s) or additives may include reactive monomers or oligomers with reactive groups, applied as aqueous dispersions, emulsions or as neat liquids or molten media for example as a hot melt adhesive.

The binder may also act as a compatibiliser for the fibre and bulk matrix plastic in the end composite, and, thus, the present invention allows a compatibiliser to be added to the fibre and binder to afford greater bonding between polymers and wood fibre. The compatibiliser can be any of the polymers above or their mixtures or blends and can be, or contain, other added materials also. It may be a formulated or reactive polymer system. For polyolefin matrix end composites it is preferably a maleated or acid functional copolymer, such as maleated polypropylene, maleated polyethylene, or an ethylene acrylate or ethylene vinyl acetate copolymer or terpolymer. Preferably the compatibiliser is an emulsified or dispersed polymer or one dissolved in water or is a powder polymer readily mixed or dispersed in the formaldehyde resin. Alternatively it can be formulated as a hot melt adhesive, with added tackifier resins and/or waxes for example, and, if desired, introduced separately to the formaldehyde resin The thermoset resin may be modified by the thermoplastic polymer(s), and/or oligomer(s) and/or monomer(s) either by blending into resin prepolymers, or into resin prepolymer syntheses, or into blowline addition or impregnation equipment, either at simultaneous or separate dual addition points. Alternatively, the thermoset resins can be modified by incorporation of the thermoplastic component in the synthesis of the formaldehyde resin by incorporating into the resin prepolymer structure. The thermoplastic component can also be added separately during a fibre processing-impregnation process and for example the thermoset resin may be added at one point in a fibre refining-impregnation process and the modifying thermoplastic component added at another point or port in the same process (e.g. at different points during blowline impregnation). The thermoset resin may be an aqueous based resin. The modifying thermoplastic polymer, oligomer or monomer system may be added as a water based solution, dispersion formulation or as a low melting or hot melt formulation or as a wax like material. Formulated hot melt adhesives systems are also useful as the modifying polymer system, particularly when added via a separate addition point to the formaldehyde resin injection. Examples of hot melt adhesives also includes the above polymers mixed with or formulated for melt-flow with added tackifiers, resins, rosins and/or waxes and the like.

As stated in other embodiments a low amount of urea formaldehyde without a modifying thermoplastic component is used. In this embodiment the solid product may comprise or less than 6 parts, preferably between 0.2 and 5 parts of urea formaldehyde alone, per 100 parts of fibre by dried weights. In some forms, the pellets or granules preferably comprise 4 or 5 parts of urea formaldehyde alone, per 100 parts of fibre by dried weights.

Preferably thermomechanical or thermo-mechanically refined pulp or chemo-mechanical pulp, or chemo-thermomechanical pulp, wherein optional pre-digestion of fibres or chips can occur before entering the fibre refiner, is used as the fibre. More preferably high temperature thermomechanical pulp, such as medium density fibreboard fibre (MDF) is used. Thus, one embodiment of this invention uses modified MDF (medium density fibre board) processes to overcome the difficulties and issues highlighted above in fibre-feeding, fibre-drying and fibre-plastic compatibility. Preferably a major fraction of the fibres have an aspect ratio of at least 10:1, more preferably at least 20:1, and most preferably at least 25:1.

Although in principle any fibre or filler can be used in the invention the advantages are most evident with fibres or other fillers which are difficult to feed into plastics processing, or other, machinery in their individual, separated, loose, normal or other readily available forms. In particular cellulosic or ligno-cellulosic fibres are preferred especially from natural origins such as wood (all types), plant or crop fibres (hemp, straw, wheat, flax, NZ flax, corn, coconut, grasses, kenaf, jute, sisal, ramie, kudzu,) and animal fibres such as wool/keratin, other protein fibres. Often such fibres have low bulk densities and are entangled or curled fibre bundles difficult to flow or feed into small orifices and to convey in metered way into extruders etc.

As stated in some embodiments the process includes conveying the fibres along a conduit in a dry or wet stream and introducing the binder formulation into the interior of the conduit to apply the formulation to the fibres while the fibres are moving through the conduit. As stated the binder may be in aqueous solution or an emulsified or aqueous polymer dispersion alone or in admixture with other co-solvents or comprise a formulation of ingredients which is a dispersion, emulsion or solution or a neat liquid or is a powder. Alternative solutes or dispersion media may be used such as alcohols or other organic solvents. Latexes may be used. Dry or neat polymer powders may also be used under varying conditions and low melting waxes or polymers or blends, as high or 100% solids, may also be used according to viscosity and tack requirements of the application apparatus such as spray gun/nozzle. Heated tubing and heated nozzles may be used to aid introduction of such materials. In another form the process includes introducing the binding agent in a particulate form into the conduit by blowing the particulate into the interior of the conduit as the fibres or particles move through the conduit, to mix intimately with the fibres. Additional resin powder (the same or different from that applied wet or as a powder in the blowline or at other points of the flowing fibre stream) may be added at the mattress assembly or pressing stage. Preferably the fibres have an average fibre length or fibre-bundle length of at least about 0.8 mm, more preferably at least about 1 mm.

The binder holds the fibres together when formed or pressed or heated into a sheet or other shape, and when such pressings or shapes are chopped or comminuted into pellets or granules, and the binder or coating will also still allow subsequent convenient feeding into, and processing in, plastic processes and machinery and mixing or moulding with other plastic materials. The process may also include pre-coating or partially pre-coating or pre-compatibilising wood or other natural fibres, or introducing other functional materials on, in, or close to, such fibres, which can then be processed into a convenient pellet or feedstock for use in plastic processing, and blending with plastics and other materials, especially in thermoplastic processes such as extrusion or injection moulding.

The binder formulation may be introduced into the conduit by spraying the formulation into the interior of the conduit as the fibres move through the conduit or pouring into the interior of the conduit or introducing into the conduit as a molten flow, to coat or partially coat the fibres. The conduit may convey the fibres from a refiner stage in a plant for manufacture of fibre board. The conduit may convey the fibres to or from a drying stage or drier. The binder can be added in a refiner or in a blowline or in a drier or at any point, prior to or after any of these stages in the tubes or pipes or drums or other vessels which convey or transfer fibre continuously in the process. The binder may be applied to wet fibres or dried fibres or to fibres with equilibrium or near equilibrium moisture content (EMC, typically of the order of 12 wt % moisture). The binder coating is added to the flowing fibre, stream, which may contain bundles or fines, and which are entrained in air or high humidity air, at any point of the MDF process, or related fibre-refining—impregnation manufacturing processes.

Embodiments of the invention produce a solid panel, sheet or profile by compacting, for example with heat and pressure in a press, the fibre wetted with added polymer. Preferably a hot press is used to compress the fibre into a solid panel or sheet. The panel can then be comminuted into pellets or granules producing pre-compatibilised fibre concentrates which can then be readily fed and metered into extruders or other plastics processing machinery, usually with pre-drying. In one example of the invention pellets or granules containing wood fibre and polymer(s) can be prepared for example by cutting or slicing the consolidated form resulting from pressing.

Typically the process then includes forming the fibres into a solid product by pressing the fibres to a solid product in planar form. The process may include pressing the fibres between heated platens or in a heated continuous press. The process may include pressing the fibres into a sheet of up to about 2 cm in thickness, up to about 1 cm in thickness, up to about 5 mm in thickness. It has also been surprisingly found that solid products formed by the process of the invention or at least embodiments thereof may have superior mechanical properties such as tensile strength and/or stiffness for example, to composite products formed in the same way but with only a thermoset or only a thermoplastic binder, so that the solid products may be useful as end products, such as panels or as composite replacements for medium density fibreboard mouldings for example.

The process may then include breaking down the resulting solid panel product to said pellets or granules by cutting or sawing the solid product. The pellets may be longer than the average fibre length of the fibres within the pellets.

A press, for example a traditional MDF process or other refining process, may be used to produce wood fibre from wood or natural plant fibre from plants, and then apply the binder in the blowline or refiner and related processes. The fibre-binder blend is dried and formed into a mat before pressing in a traditional MDF press to produce sheets. The sheets are subsequently reduced to concentrates, agglomerates, particles, tapes or pellets that can be fed into plastics processing equipment. For example the sheets can be slit and pelletised with pellet lengths of any desired length according to the chopping length set and the initial pressed sheet dimensions. Preferably the pellet length will be longer than fibre length. For example 2 mm, 3 mm or 4 mm or 5 mm or 6 mm or longer may be used.

To allow the MDF fibre to remain consolidated after pressing, the binder is added, for example into the blowline, shortly after fibres are formed in the process. Alternatively the fibres may be collected from the refining process and subsequently turbulently reflowed in a stream, then sprayed or impregnated with binder polymer solution or dispersion. The binder needs to have sufficient strength to hold the fibres in a sheet and in a solid pellet, when pelletised. The binder should have a glass transition, melt, dissociation, softening or degradation temperature such that fibres are allowed to become mobile in the plastics processing equipment, such as in the barrel of an extruder, and form a uniform blend with the thermoplastic material it is being blended with. The binder can be added at low loadings solids on fibre. Preferentially the binder will act to improve compatibility between the fibre and bulk plastic matrix. Preferentially the binder coated fibres are pressed under heat to form a sheet with sufficient integrity to withstand slitting and pelletisation processes. This may also impart or retain intimate mixing, contact or bonding of the binder/compatibiliser with fibre and/or remove some of the moisture.

The process may typically be performed in many conventional MDF or particleboard mills wherein fibres are refined and impregnated in blowline or similar facilities, pressed under heat, but, in the process of the invention, then slitted and chopped into pellets and, preferentially, the binder resin is a resin system which is compatible with the ultimate thermoplastic matrix of choice and processable in plastics machinery such as extrusion or injection moulding. Thus, it is feasible that conventional MDF or similar mills, or their products, could be adapted to produce fibre concentrates for plastics extrusion or injection moulding or other moulding processes, to make fibre-plastic composites. The binder formulation may also comprise other additives such as stabilisers, plasticisers, process aids, flame retardants, adhesion promoters, colorants, lubricants, anti-static agents, bioactives, liquid additives or solids difficult to introduce into the extruder or required at low levels overall and may also include reactive or functional resins such as epoxy resins. The pressing of the intermediate sheets can be carried out to a range of sheet densities. The pelletisation of such sheets can be carried out by a variety of methods and a range of pellet lengths and dimensions and shapes can be used. Pre-patterning or imprinting of the sheets can be carried during or after sheet manufacture out to aid the subsequent pellet manufacture.

The wood fibre pellets or granules or the product in other solid intermediate form may be used for feeding into thermoplastic processing equipment, such as extruders or injection moulders. When mixing the fibre-rich pellets with plastic pellets and/or other additives in an extruder various combinations of mixing approaches and relative positions of introduction are feasible. The fibre pellet may be added directly to a plastics injection moulding or extrusion machine, with added plastic pellets, substantially without damage to at least a major fraction of the fibre so that the fibre becomes dispersed through molten plastics material in the machine, to form a plastics-fibre composite product. A coupling agent between the fibres and plastics material in the machine may also be introduced into the plastics extrusion or moulding machine to mix with the fibres. Suitable as a coupling agent may be any one or more of an organic acid, maleated polyolefin, silane, silicate, titanate, chlorotriazine, anhydride, epoxide, isocyanate, acrylate, amide, imide, or abietic acid. Preferred coupling agents include any one or more of a maleated polyolefin including a maleic anhydride or acid, a silane, acrylic-modified polytetrafluoroethylene, or a chloroparafin.

Further it has also been surprisingly found that solid products formed by the process of the invention with thermoplastic modification of a thermoset resin binder may have superior mechanical properties such as tensile strength and/or stiffness for example, so that the solid products may be useful as end products, such as panels or as composite replacements for medium density fibreboard mouldings for example.

EXAMPLES

The following description of experimental work further illustrates the invention, though is not to be considered in any way limiting and modifications can be made with respect to the invention by one of ordinary skill in the art.

Example 1

Thermoplastic Modified UF Resin

Materials

Urea formaldehyde (UF) resin E0 with 65% solids content (water-based).

Ethylene vinyl acetate emulsion (EVA) DA-101 (water-based) with 55% solids content.

Vinyl acetate ethylene (VAE) powder 100% solids

Maleic anhydride polypropylene emulsion (MAPP) (water-based) with 40% solids content.

Ethylene acrylic acid (EAA) dispersion (water-based) with 25% solids content.

Polypropylene matrix with 25 MFI (230° C./2.16 kg).

Maleic anhydride polypropylene (MAPP).

Wood fibre refined from radiata pine chips.

Binder Formulations

Four different thermoplastic polymers were separately added to UF at 20 and 40% loading on solid basis. Nine binder solutions were prepared. These are listed in Table 1.

TABLE 1

Composition of the different UF-thermoplastic polymer formulations

| Composition (solid basis %) | Solids content (%) |
|---|---|
| 20% EVA + 80% UF | 62.75 |
| 40% EVA + 60% UF | 60.6 |
| 20% EAA + 80% UF | 44.8 |
| 40% EAA + 60% UF | 39.63 |
| 20% VAE + 80% UF | 58.2 |
| 40% VAE + 60% UF | 53.1 |
| 20% MAPP + 80% UF | 57.8 |
| 40% MAPP + 60% UF | 52 |
| 100% UF | 65 |

All the binder formulations were prepared by adding the components together and stirring with a high shear mixer at 8000 rpm for 2 minutes, and were then sprayed "fresh" onto the wood fibre, immediately after mixing or with a delay of less than an hour. The VAE powder was put into water suspension at 37.5% solids content before being mixed with UF resin.

MDF Panels & Wood Pellets

MDF panels were made on a lab scale each as follows: Wood fibres with an initial moisture content of 8.5% were introduced into a blender and 5% of binder (on a solids basis), based on oven dried wood fibre and allowing 58% losses in the spray gun, was sprayed on the fibres. The coated wood fibres were formed into a 278×255 mm mat, with 170 g of OD fibre per mat. The mat was hot pressed at 180° C. between two caul plates with a 3.05 mm spacer on both sides of the panel for 3 minutes at 120 kilo-Newtons. A density of 750 kg/m$^3$ was targeted for each panel. Ten MDF panel samples were made with the nine binder formulations prepared as described above plus one MDF panel without any resin on the fibre considered as a reference. The panels were chopped into 5*5 mm pellets. A 50 mm strip was cut in the middle of each panel for internal bond testing. All the samples were sieved to remove and measure the dust caused by the chopping step.

Composites

MDF wood pellets and MAPP were oven dried at 100° C. and 60° C. respectively overnight (~16 hours) prior to extrusion. The MDF fibres were combined with the polymer in a twin screw Labtech™ extruder type LTE 26-40 (26 mm co-rotating screws; 1/d=40) with a vent. A premix of 40 wt % MDF pellet/57 wt % PP/3 wt % MAPP was fed "upstream" into the extruder by the main hopper. The compound went through a four-strand die and was water-cooled before being pelletized. Low shear extrusions conditions were used to assess the ability of the MDF pellets to "release" the fibres into the polymer. The extruder settings are outlined in Table 2 and Table 3.

TABLE 2

Extruder Barrel temperature

| | Zone | | | | | | | | | |
|---|---|---|---|---|---|---|---|---|---|---|
| | 1 | 2 | 3 | 4 | 5 | 6 | 7 | 8 | 9 | die |
| T (° C.) | 180 | 180 | 180 | 180 | 180 | 180 | 180 | 180 | 180 | 180 |

TABLE 3

Extruder settings

| Rotational screw speed (rpm) | Hopper screw speed (rpm) |
|---|---|
| 100 | 40 |

The extrusion parameters monitored for each composite are presented in Table 4; the temperature of the melt was kept below 200° C.

TABLE 4

Extrusion parameters

| Label | Torque (%) | Die Pressure (bar) | Melt temperature (° C.) 1 | 2 | 3 | 4 | Die |
|---|---|---|---|---|---|---|---|
| 20EVA | 48 | 68 | 173 | 179 | 176 | 177 | 184 |
| 40EVA | 48 | 60 | 172 | 178 | 174 | 175 | 182 |
| 20EAA | 48 | 67 | 165 | 173 | 169 | 171 | 176 |
| 40EAA | 48 | 60 | 166 | 169 | 168 | 169 | 174 |
| 20VAE | 48 | 62 | 176 | 179 | 178 | 179 | 187 |
| 40VAE | 48 | 59 | 175 | 180 | 177 | 179 | 186 |
| 20MAPP | Ø* | Ø* | Ø | Ø | Ø | Ø | Ø |
| Pure UF resin | 48 | 57 | 166 | 174 | 168 | 170 | 175 |
| no binder "H2O" | Ø* | Ø* | Ø | Ø | Ø | Ø | Ø |

The ten wood-plastic pellets samples were dried in an oven at 60° C. overnight and then injection moulded using the tensile and flexural specimens mould cavities as in Table 5 below.

TABLE 5

Injection moulding parameters

| Barrel temperatures (Celsius) | | | |
|---|---|---|---|
| nozzle | 3 | 2 | 1 |
| 180 | 180 | 180 | 180 |

| Mould Temperature (Celsius) |
|---|
| 30 |

| Barrel position (mm) | | | | | |
|---|---|---|---|---|---|
| 6 | 5 | 4 | 3 | 2 | 1 |
| 4 | 5 | 6 | 7 | 8 | 40 |

| Screw speed (rpm) | |
|---|---|
| 2 | 1 |
| 50 | 75 |

TABLE 5-continued

Injection moulding parameters

| Injection speed (mm/s) | | |
|---|---|---|
| 3 | 2 | 1 |
| 44 | 58 | 80 |

| Injection pressure (bar) | |
|---|---|
| 2 | 1 |
| 85 | 75 |

| Hold time (s) | | |
|---|---|---|
| 3 | 2 | 1 |
| 2 | 1.2 | 0.5 |

| Hold pressure (bar) | | | |
|---|---|---|---|
| 4 | 3 | 2 | 1 |
| 25 | 25 | 25 | 30 |

All the MDF pellets were fed easily through the extruder apart from the 'no binder' pellets. The pellet integrity was kept, and the fibres were fully released in the extruder under low shear extrusion conditions. Good mechanical properties of the relevant composites were observed.

Example 2

Thermoplastic Modified UF Resin with Coupling Agent

The influence of the thermoplastic:UF ratio on the MDF panels properties was investigated and the effect on the pelletization process of the panel into pellet. It is recognized within the MDF panel industry that a minimum cohesive strength of the panel is required to be able to manufacture it on a production line using a continuous hot press. The panel leaves the press while still hot which could compromise the bonding with the presence of thermoplastic because it can still be soft at this temperature. As a result, the risk of blowing up the panel could be critical. Further, the adhesive must keep the fibres together during the pelletization otherwise large quantity of material would be wasted and a fire hazard and health issue would arise with the quantity of dust being generated.

Materials

Urea formaldehyde (UF) resin E0 with 65% solids content (water-based).

Ethylene vinyl acetate emulsion (EVA) DA-101 (water-based) with 55% solids content.

Ethylene acrylic acid (EAA) dispersion (water-based) with 25% solids content.

Polypropylene matrix with 25 MFI (230° C./2.16 kg).

High density polyethylene (HDPE) with 18 MFI.

Maleic anhydride polypropylene (MAPP).

Maleic anhydride polyethylene (MAPE).

Wood fibre refined from radiata pine chips.

Binder Formulations

UF resin was modified by adding the EVA or EAA emulsions at different ratios, 5, 10, 20 and 40 wt % on a solid basis. These are listed in Table 6. All the formulations were prepared by adding the components together and stirring at 8000 rpm for 2 minutes, and were sprayed onto the wood fibre "fresh", immediately after mixing or with a delay less than an hour.

TABLE 6

Composition of the different UF-thermoplastic polymer formulations

| Composition (solid basis wt %) | Solids content (%) |
|---|---|
| 3% UF resin | 65.0 |
| 6% UF resin | 65.0 |
| 12% UF resin | 65.0 |
| 3% EVA | 55.0 |
| 6% EVA | 55.0 |
| 12% EVA | 55.0 |
| 3% EAA | 25.0 |
| 6% EAA | 25.0 |
| 12% EAA | 25.0 |
| 3% (5% EVA + 95% UF) | 64.5 |
| 3% (10% EVA + 90% UF) | 63.8 |
| 3% (20% EVA + 80% UF) | 62.7 |
| 3% (40% EVA + 60% UF) | 60.6 |
| 6% (5% EVA + 95% UF) | 64.5 |
| 6% (10% EVA + 90% UF) | 63.8 |
| 6% (20% EVA + 80% UF) | 62.7 |
| 6% (40% EVA + 60% UF) | 60.6 |
| 12% (5% EVA + 95% UF) | 64.5 |
| 12% (10% EVA + 90% UF) | 63.8 |
| 12% (20% EVA + 80% UF) | 62.7 |
| 12% (40% EVA + 60% UF) | 60.6 |
| 3% (5% EAA + 95% UF) | 60.2 |
| 3% (10% EAA + 90% UF) | 56.0 |
| 3% (20% EAA + 80% UF) | 49.2 |
| 3% (40% EAA + 60% UF) | 39.0 |
| 6% (5% EAA + 95% UF) | 60.2 |
| 6% (10% EAA + 90% UF) | 56.0 |
| 6% (20% EAA + 80% UF) | 49.2 |
| 6% (40% EAA + 60% UF) | 39.0 |
| 12% (5% EAA + 95% UF) | 60.2 |
| 12% (10% EAA + 90% UF) | 56.0 |
| 12% (20% EAA + 80% UF) | 49.2 |
| 12% (40% EAA + 60% UF) | 39.0 |

MDF Panels & Wood Pellets

MDF panels were made on a lab scale generally as described in example 1 above, with the formulations listed in Table 6. A 50 mm strip was cut in the middle of each panel for internal bond testing. The rest of the MDF panels were chopped into 5*5 mm pellets with the chopping machine. All the samples were sieved to remove and measure the dust caused by the pelletizing process.

Composites

Pellets were introduced into an extruder generally as described in example 1 above. A premix of 40 wt % MDF pellet with 57 wt % PP or HDPE, with 3 wt % MAPP or MAPE (Table 7 and 8) respectively was fed into the extruder. Low shear extrusion conditions were used to assess the ability of the pellets to release the fibres into the polymer under gentle mixing. Some of the formulations were replicated without a coupling agent. The WPC's made of MDF pellets with 3 and 6 wt % EVA on the fibres were hard to feed into the extruder because the premix had to be pushed through the screws with a wooden stick as the material built up in the feeding port. This effect was caused by the MDF pellets being more bulky/fluffy than the others (the pellets did not keep integrity after chopping).

TABLE 7

PP based wood plastic composites with coupling agent

| Resin loading on MDF | Resin Composition | 57 wt % Matrix | 3 wt % coupling agent |
|---|---|---|---|
| | 40 wt % Reinforcement | | |
| 3 wt % on MDF | 100% UF | PP | MAPP |
| | 5% EAA/95% UF | | |
| | 10% EAA/90% UF | | |
| | 20% EAA/80% UF | | |
| | 40% EAA/60% UF | | |
| | 100% EAA | | |
| 6 wt % on MDF | 100% UF | | |
| | 5% EAA/95% UF | | |
| | 10% EAA/90% UF | | |
| | 20% EAA/80% UF | | |
| | 40% EAA/60% UF | | |
| | 100% EAA | | |
| 12 wt % on MDF | 100% UF | | |
| | 5% EAA/95% UF | | |
| | 10% EAA/90% UF | | |
| | 20% EAA/80% UF | | |
| | 40% EAA/60% UF | | |
| | 100% EAA | | |
| 3 wt % on MDF | 5% EVA/95% UF | | |
| | 10% EVA/90% UF | | |
| | 20% EVA/80% UF | | |
| | 40% EVA/60% UF | | |
| | 100% EVA | | |
| 6 wt % on MDF | 5% EVA/95% UF | | |
| | 10% EVA/90% UF | | |
| | 20% EVA/80% UF | | |
| | 40% EVA/60% UF | | |
| | 100% EVA | | |
| 12 wt % on MDF | 5% EVA/95% UF | | |
| | 10% EVA/90% UF | | |
| | 20% EVA/80% UF | | |
| | 40% EVA/60% UF | | |
| | 100% EVA | | |

TABLE 8

HDPE based wood plastic composites with coupling agent

| Resin loading on MDF | resin composition | 57 wt % Matrix | 3 wt % coupling agent |
|---|---|---|---|
| | 40 wt % Reinforcement | | |
| 3 wt % on MDF | 100% UF | HDPE | MAPE |
| | 20% EAA/80% UF | | |
| | 40% EAA/80% UF | | |
| | 100% EAA | | |
| 6 wt % on MDF | 100% UF | | |
| | 20% EAA/80% UF | | |
| | 40% EAA/60% UF | | |
| | 100% EAA | | |
| 12 wt % on MDF | 100% UF | | |
| | 20% EAA/80% UF | | |
| | 40% EAA/60% UF | | |
| | 100% EAA | | |
| 3 wt % on MDF | 20% EVA/80% UF | | |
| | 40% EVA/60% UF | | |
| | 100% EVA | | |
| 6 wt % on MDF | 20% EVA/80% UF | | |
| | 40% EVA/60% UF | | |
| | 100% EVA | | |
| 12 wt % on MDF | 20% EVA/80% UF | | |
| | 40% EVA/60% UF | | |
| | 100% EVA | | |

TABLE 9

PP based wood plastic composites without coupling agent

| Resin loading on MDF | Resin Composition | 60 wt % Matrix |
|---|---|---|
| | 40 wt % Reinforcement | |
| 3 wt % on MDF | 100% UF | PP |
| | 20% EAA/80% UF | |
| | 100% EAA | |
| 6 wt % on MDF | 100% UF | |
| | 20% EAA/80% UF | |
| | 100% EAA | |
| 12 wt % on MDF | 100% UF | |
| | 20% EAA/80% UF | |
| | 100% EAA | |
| 3 wt % on MDF | 20% EVA/80% UF | |
| | 100% EVA | |
| 6 wt % on MDF | 20% EVA/80% UF | |
| | 100% EVA | |
| 12 wt % on MDF | 20% EVA/80% UF | |
| | 100% EVA | |

TABLE 10

HDPE based wood plastic composites without coupling agent

| Resin loading on MDF | resin composition | 60 wt % Matrix |
|---|---|---|
| | 40 wt % Reinforcement | |
| 3 wt % on MDF | 100% UF | HDPE |
| | 20% EAA/80% UF | |
| | 100% EAA | |
| 6 wt % on MDF | 100% UF | |
| | 20% EAA/80% UF | |
| | 100% EAA | |
| 12 wt % on MDF | 100% UF | |
| | 20% EAA/80% UF | |
| | 100% EAA | |
| 3 wt % on MDF | 20% EVA/80% UF | |
| | 100% EVA | |
| 6 wt % on MDF | 20% EVA/80% UF | |
| | 100% EVA | |
| 12 wt % on MDF | 20% EVA/80% UF | |
| | 100% EVA | |

The WPC pellet samples were dried in an oven at 60° C. overnight and then injection moulded.

Testing

Density Profile

A Proscan density profiler was used to measure the density profile of each sample tested for internal bond strength (internal bond). The average density of the sample was measured, as well as the density profile through the cross-section of the specimen. All the MDF panels had an average density close to the 750 kg/m$^3$ targeted.

Internal Bond

Two of the four panels made for each formulation were tested for internal bond on a Zwick 1445 universal testing machine with a crosshead motion of 1 mm/min and 10 Newtons preload. The lowest internal bond strength was the MDF panel made of pure EVA resin, especially at low loading. All the other formulations had an internal bond value above 0.5 Mpa which indicates high enough fibre bonding to produce a MDF panel on a commercial line.

Fibre Dispersion

The UF resin modified by incorporating a thermoplastic polymer into it resulted in easier and better dispersion and distribution of the fibre pellets during extrusion compounding with plastic.

Photos of the injection moulded tensile test specimen were taken to evaluate visually the dispersion of the MDF pellets into individual fibres in the plastic matrix after processing.

At 20 wt % thermoplastic ratio and particularly at 40 wt % thermoplastic ratio high fibre dispersion on the surfaces of the injection moulded WPCs could be seen.

Dust Generation

The MDF panels were cut into 5×5 mm square pellets with a pneumatic chopping machine. A dust measurement was performed on the MDF wood pellets collected; the wood pellets were introduced into a sieving box with a 2 mm mesh size and were shaken by hand for one minute. The particles going through the mesh were weighed and converted into a "dust percentage" of the original pellet mass. Some dust was generated during the pelletization of MDF panels into MDF wood pellets. The dust was composed of wood fines and loose fibres. For safe handling, the MDF pellets need to have low residual dust. The MDF wood pellets with 3 wt % pure EVA adhesive had the highest level of dust generated by pelletization with 6.6% and were less than optimal for handling and feeding into the extruder. Apart for the 3 and 6 wt % EVA formulations, all the MDF pellets showed good pellet integrity and would allow easy pellet handling for transport and easy feeding into an extruder Coupling Agent The use of a coupling agent is advantageous to achieve optimal mechanical properties when formulating natural fibre reinforced plastic. The coupling agent bridges the fibre and plastic; it reacts with the fibre surface and is compatible with the plastic matrix thereby ensuring a good stress transfer between the two components.

Example 3

Thermoplastic Modified Isocyanate Resin

Materials

Methylene diphenyl diisocyanate (MDI) resin, 100% solid, liquid form.

Polyethylene emulsion (PE) (water-based) with 40% solids content.

Polypropylene matrix with 25 MFI (230° C./2.16 kg).

Maleic anhydride polypropylene.

Wood fibre refined from radiata pine chips.

Resin Loading on MDF and MDI/MAPE Ratio Mixes

Two MDI-PE formulations as in Table 1 were proposed generally as described in the earlier examples and added to the MDF wood fibre to make MDF panels as described above. The MDI resin was modified by adding 20 wt % of PE emulsion into it, on a solids basis.

TABLE 8

Composition of the different MDI-thermoplastic formulations

| Composition (solid basis wt %) | Solids content (%) |
|---|---|
| 1% (20% PE + 80% MDI) | 73.2 |
| 3% (20% PE + 80% MDI) | 73.2 |

Internal Bond

Both binder formulations produced an internal bond value above 0.5 Mpa which indicates high enough fibre bonding to produce an MDF panel on a commercial line.

Fibre Dispersion

The MDI resin modified by incorporating a thermoplastic polymer into it resulted in easier and better dispersion and distribution of the fibre pellets during extrusion compounding with plastic.

The invention claimed is:

1. A process for producing a product comprising wood fibres, for use as or in forming a feedstock in plastics manufacture, which comprises applying to lose or divided wood fibres or wood fibre bundles, produced by mechanically or thermomechanically or chemo-thermomechanically or chemo-mechanically breaking down wood, a liquid or particulate binder formulation comprising a thermoset resin and a thermoplastic polymer, monomer, or oligomer, and consolidating the fibres into a solid product which may be subsequently broken down to release a major fraction of the fibres, the thermoset resin being selected from a formaldehyde-based polymer and an isocyanate, the solid product comprising less than 10 parts of the binder formulation per 100 parts of wood fibre by dried weight and from about 0.3 to about 5 parts of the thermoset resin per 100 parts of wood fibre by dried weight.

2. A process according to claim 1 wherein the binder formulation comprises less than 8 parts per 100 parts of fibre by dried weight.

3. A process according to claim 1 wherein the thermoplastic polymer, monomer, or oligomer is present relative to the thermoset resin in a weight ratio up to about 50:50.

4. A process according to claim 1 wherein the solid product may be broken down under heat and mechanical shearing in a plastics manufacturing process to release the major fraction of the fibres.

5. A process according to claim 4 wherein the major fraction of the fibres may be broken down with reduced damage to the fibres relative to breaking down in the same way of an equivalent solid product produced by the same process, but for an absence of the thermoplastic polymer, monomer, or oligomer in the binder formulation.

6. A process according to claim 1 wherein the binder formulation comprises a mixture of the thermoset resin and thermoplastic polymer, monomer, or oligomer or wherein the binder formulation comprises the thermoplastic polymer, monomer, or oligomer incorporated into the thermoset resin structure.

7. A process according to claim 1 which comprises separately applying the thermoset resin and the thermoplastic polymer, monomer, or oligomer components of the binder formulation to the fibres.

8. A process according to claim 1 comprising applying the binder formulation or components thereof to the fibres while conveying the fibres in a dry or wet air stream.

9. A process according to claim 1 wherein the fibres have an average fibre length or fibre-bundle length of at least about 0.8 mm.

10. A process according to claim 1, wherein a major fraction of the fibres have an aspect ratio of at least 10:1.

11. A process according to claim 1 including breaking down the solid product to produce pellets which are longer than the average fibre length of the fibres within the pellets.

12. A process according to claim 1 wherein the thermoplastic polymer is polyethylene, polypropylene, polystyrene, polyvinyl alcohol, polyvinyl acetate, polyvinyl butyrate, polyester, polyacrylate, or starch based, or is a polymer or copolymer with one or more of a co-monomer with acid, anhydride, epoxy, amine, isocyanate, silane, or silanol functional group, or is a copolymer or terpolymer or other polymer of ethylene and/or propylene and/or butadiene and/or styrene and/or acrylonitrile, and one or more of vinyl acetate, vinyl butyrate, maleic anhydride/acid, acrylic or methacrylic acid or their esters, glycidyl methacrylate or acrylate.

13. A process according to claim 1 wherein the solid product has an internal bond strength of at least 0.5 MPa.

14. A process according to claim 1 including forming the fibres into a solid product by pressing the fibres to a solid product in planar form in a heated press.

15. A process according to claim 1 including breaking down said solid product to said pellets or granules by cutting or sawing the solid product.

16. A process for producing pellets or granules comprising wood fibres, for use as a feedstock in plastics manufacture, which comprises:
conveying loose or divided wood fibres or wood fibre bundles, produced by mechanically or thermomechanically or chemo-thermomechanically or chemo-mechanically breaking down wood, in a dry or wet air stream and applying to the fibres, while so conveying the fibres, a liquid formulation comprising urea formaldehyde and one or more thermoplastic polymers, monomers, or oligomers, or a low amount of urea formaldehyde resin binder,
forming the fibres into a solid product, and
breaking down the solid product to produce said pellets or granules,
the pellets or granules comprising less than 10 parts of the liquid formulation per 100 parts of wood fibre by dried weight and from about 0.3 to about 5 parts of the urea formaldehyde per 100 parts of wood fibre by dried weight.

17. A panel product comprising wood fibres and a binder formulation, the binder formulation comprising a thermoset resin and a thermoplastic polymer, monomer, or oligomer, the thermoset resin being selected from a formaldehyde-based polymer and an isocyanate, the panel product comprising less than 10 parts of binder formulation per 100 parts of fibre by dried weight and from about 0.3 to about 5 parts of the thermoset resin per 100 parts of fibre by dried weight.

18. Pellets or granules comprising wood fibres and a binder formulation, the binder formulation comprising a thermoset resin and a thermoplastic polymer, monomer, or oligomer, the thermoset resin being selected from a formaldehyde-based polymer, and an isocyanate, the pellets or granules comprising less than 10 parts of binder formulation per 100 parts of fibre by dried weight and from about 0.3 to about 5 parts of the thermoset resin per 100 parts of fibre by dried weight.

19. A process for manufacture of plastics products or intermediates which includes introducing pellets or granules of claim 18 as a feedstock into a plastics extrusion or moulding machine.

20. A process according to claim 19 including also introducing into the plastics extrusion or moulding machine to mix with the fibres a coupling agent between the fibres and plastics material.

21. A process according to claim 19 including also introducing into the plastics extrusion or moulding machine as a coupling agent any one or more of an organic acid, maleated polyolefin, a maleic anhydride or acid, silane, silicate, titanate, chlorotriazine, anhydride, epoxide, isocyanate, acrylate, amide, imide, acrylic-modified polytetrafluoroethylene, a chloroparafin or abietic acid.

22. A process according to claim 19 wherein the thermoplastic polymer comprises polypropylene and the coupling agent comprises maleic anhydride polypropylene or the thermoplastic polymer comprises polyethylene and the coupling agent comprises maleic anhydride polyethylene.

23. A plastics-fibre composite product produced by the process of claim 19.

24. A panel according to claim 17 wherein the thermoplastic polymer, monomer, or oligomer is present relative to the thermoset resin in a weight ratio up to about 50:50.

25. Pellets or granules according to claim 18 wherein the thermoplastic polymer, monomer, or oligomer is present relative to the thermoset resin in a weight ratio up to about 50:50.

26. A process according to claim 19 wherein the thermoplastic polymer, monomer, or oligomer is present relative to the thermoset resin in a weight ratio up to about 50:50, 40:60, 20:80 or 10:90.

27. A panel according to claim 17 wherein the thermoplastic polymer, monomer, or oligomer is present relative to the thermoset resin in a weight ratio up to about 40:60.

28. A panel according to claim 17 wherein the thermoplastic polymer, monomer, or oligomer is present relative to the thermoset resin in a weight ratio up to about 20:80.

29. A panel according to claim 17 wherein the thermoplastic polymer, monomer, or oligomer is present relative to the thermoset resin in a weight ratio up to about 10:90.

30. Pellets or granules according to claim 18 wherein the thermoplastic polymer, monomer, or oligomer is present relative to the thermoset resin in a weight ratio up to about 40:60.

31. Pellets or granules according to claim 18 wherein the thermoplastic polymer, monomer, or oligomer is present relative to the thermoset resin in a weight ratio up to about 20:80.

32. Pellets or granules according to claim 18 wherein the thermoplastic polymer, monomer, or oligomer is present relative to the thermoset resin in a weight ratio up to about 10:90.

33. A panel according to claim 17 wherein the formaldehyde-based polymer is urea formaldehyde.

34. A panel according to claim 27 wherein the formaldehyde-based polymer is urea formaldehyde.

35. A panel according to claim 28 wherein the formaldehyde-based polymer is urea formaldehyde.

36. A panel according to claim 29 wherein the formaldehyde-based polymer is urea formaldehyde.

37. Pellets or granules according to claim 18 wherein the formaldehyde-based polymer is urea formaldehyde.

38. Pellets or granules according to claim 30 wherein the formaldehyde-based polymer is urea formaldehyde.

39. Pellets or granules according to claim 31 wherein the formaldehyde-based polymer is urea formaldehyde.

40. Pellets or granules according to claim 32 wherein the formaldehyde-based polymer is urea formaldehyde.

41. A panel according to claim 17 wherein the thermoplastic polymer, monomer, or oligomer is present relative to the thermoset resin in a weight ratio of about 1:99 to about 50:50.

42. Pellets or granules according to claim 18 wherein the thermoplastic polymer, monomer, or oligomer is present relative to the thermoset resin in a weight ratio of about 1:99 to about 50:50.

43. A panel according to claim 17 wherein the thermoplastic polymer, monomer, or oligomer is present relative to the thermoset resin in a weight ratio of about 1:99 to about 40:60.

44. Pellets or granules according to claim 18 wherein the thermoplastic polymer, monomer, or oligomer is present relative to the thermoset resin in a weight ratio of about 1:99 to about 40:60.

45. A panel according to claim 17 wherein the thermoplastic polymer, monomer, or oligomer is present relative to the thermoset resin in a weight ratio of about 10:90 to about 50:50.

46. Pellets or granules according to claim 18 wherein the thermoplastic polymer, monomer, or oligomer is present relative to the thermoset resin in a weight ratio of about 10:90 to about 50:50.

47. A panel according to claim 17 wherein the thermoplastic polymer, monomer, or oligomer is present relative to the thermoset resin in a weight ratio of about 10:90 to about 40:60.

48. Pellets or granules according to claim 18 wherein the thermoplastic polymer, monomer, or oligomer is present relative to the thermoset resin in a weight ratio of about 10:90 to about 40:60.

49. A process according to claim 2 wherein the binder formulation comprises less than 5 parts per 100 parts of fibre by dried weight.

50. A process according to claim 10, wherein a major fraction of the fibres have an aspect ratio of at least 20:1.

* * * * *